(12) United States Patent
Rosales

(10) Patent No.: US 10,801,236 B2
(45) Date of Patent: Oct. 13, 2020

(54) HATCH ARRANGEMENT OF A MOTOR VEHICLE

(71) Applicant: Brose Schliesssysteme GmbH & Co. Kommanditgesellschaft, Wuppertal (DE)

(72) Inventor: David Rosales, Rochester Hills, MI (US)

(73) Assignee: Brose Schilesssysteme GmbH & Co. Kommanditgesellschaft, Wuppertal (DE)

( * ) Notice: Subject to any disclaimer, the term of this patent is extended or adjusted under 35 U.S.C. 154(b) by 12 days.

(21) Appl. No.: 16/057,329

(22) Filed: Aug. 7, 2018

(65) Prior Publication Data
US 2019/0169887 A1    Jun. 6, 2019

Related U.S. Application Data

(63) Continuation-in-part of application No. 15/828,879, filed on Dec. 1, 2017, now abandoned.

(51) Int. Cl.
| | | |
|---|---|---|
| *E05B 81/20* | (2014.01) | |
| *E05B 83/18* | (2014.01) | |
| (Continued) | | |

(52) U.S. Cl.
CPC .............. *E05B 81/20* (2013.01); *B60J 5/101* (2013.01); *B60J 5/107* (2013.01); *E05B 79/20* (2013.01);
(Continued)

(58) Field of Classification Search
CPC .......... E05B 81/20; E05B 81/25; E05B 83/16; E05B 83/18; E05B 79/20; E05F 15/622;
(Continued)

(56) References Cited

U.S. PATENT DOCUMENTS

| | | |
|---|---|---|
| 4,536,021 A | 8/1985 | Mochida |
| 4,806,712 A | 2/1989 | Hoffman et al. |
| (Continued) | | |

FOREIGN PATENT DOCUMENTS

| | | |
|---|---|---|
| DE | 19511651 | 10/1995 |
| DE | 19738492 | 3/1998 |
| (Continued) | | |

OTHER PUBLICATIONS

File History for U.S. Appl. No. 14/832,236 downloaded Feb. 6, 2018 (167 pages).

(Continued)

*Primary Examiner* — Justin B Rephann
(74) *Attorney, Agent, or Firm* — Pauly, DeVries Smith & Deffner LLC

(57) ABSTRACT

The disclosure is directed to hatch arrangement having a hatch leaf, a hatch drive arrangement, a hatch lock, and a cinching system. The hatch lock has a hatch lock catch for engaging a hatch lock striker in a retaining manner in a primary latch position and in a secondary latch position, and for disengaging the hatch lock striker in an open latch position. The cinching system includes a force transfer arrangement for transferring a force exerted by the hatch drive arrangement to the hatch lock catch. The force transfer arrangement has a transfer element coupled to the hatch drive arrangement and a Bowden cable connecting the transfer element with the hatch lock catch. In the closed hatch position of the hatch leaf the hatch arrangement is free from pulling forces between the transfer element and the vehicle body.

24 Claims, 5 Drawing Sheets

(51) Int. Cl.
  *E05B 79/20*   (2014.01)
  *E05F 15/622*  (2015.01)
  *B60J 5/10*    (2006.01)
  *E05F 15/60*   (2015.01)
  *E05B 81/70*   (2014.01)

(52) U.S. Cl.
  CPC .............. *E05B 83/18* (2013.01); *E05F 15/60* (2015.01); *E05F 15/622* (2015.01); *E05B 81/70* (2013.01); *E05Y 2201/22* (2013.01); *E05Y 2900/546* (2013.01)

(58) Field of Classification Search
  CPC . E05F 15/63; E05F 15/70; E05F 15/00; E05F 15/646; E05F 15/40
  See application file for complete search history.

(56) References Cited

U.S. PATENT DOCUMENTS

| | | | |
|---|---|---|---|
| 5,639,130 | A | 6/1997 | Rogers, Jr. et al. |
| 5,865,481 | A | 2/1999 | Buschmann |
| 5,938,252 | A | 8/1999 | Kondo et al. |
| 6,053,542 | A | 4/2000 | Bastien et al. |
| 6,123,372 | A | 9/2000 | Rogers, Jr. et al. |
| 6,125,583 | A | 10/2000 | Daniels et al. |
| 6,256,932 | B1 | 7/2001 | Wludyka et al. |
| 6,382,687 | B1 | 5/2002 | Gruhn |
| 6,435,600 | B1 | 8/2002 | Williams, Jr. et al. |
| 6,505,867 | B1 | 1/2003 | Geurden et al. |
| 6,520,548 | B1 | 2/2003 | Kalsi et al. |
| 6,679,531 | B2 | 1/2004 | Rogers, Jr. et al. |
| 6,719,356 | B2 | 4/2004 | Cleland et al. |
| 7,059,640 | B2 | 6/2006 | Tensing et al. |
| 7,607,702 | B2 | 10/2009 | Pereverzev |
| 8,056,944 | B2 | 11/2011 | Jankowski et al. |
| 8,474,887 | B2 | 7/2013 | Suzuki et al. |
| 8,485,570 | B2 | 7/2013 | Konchan et al. |
| 9,103,154 | B2 | 8/2015 | Sitzler et al. |
| 9,255,436 | B2 | 2/2016 | Schönherr et al. |
| 9,677,318 | B2 | 6/2017 | Rosales et al. |
| 10,005,498 | B2 | 6/2018 | Rosales et al. |
| 2002/0040551 | A1 | 4/2002 | Zhou et al. |
| 2004/0124662 | A1 | 7/2004 | Cleland et al. |
| 2004/0212210 | A1 | 10/2004 | Roach et al. |
| 2005/0039404 | A1 | 2/2005 | Mrkovic et al. |
| 2005/0155289 | A1 | 7/2005 | Oberheide et al. |
| 2006/0181108 | A1 | 8/2006 | Cleland et al. |
| 2007/0079556 | A1 | 4/2007 | Oberheide et al. |
| 2008/0052996 | A1* | 3/2008 | Sugiura .................. E05F 15/42 49/28 |
| 2008/0105011 | A1 | 5/2008 | Machida et al. |
| 2009/0107048 | A1 | 4/2009 | Nagai et al. |
| 2009/0217596 | A1 | 9/2009 | Neundorf et al. |
| 2009/0267786 | A1* | 10/2009 | Sakamaki ............... E05F 15/44 340/686.6 |
| 2011/0057469 | A1 | 3/2011 | Zielinsky et al. |
| 2012/0285087 | A1 | 11/2012 | Eggeling et al. |
| 2012/0299313 | A1 | 11/2012 | Organek et al. |
| 2015/0283886 | A1 | 10/2015 | Nania |
| 2016/0010379 | A1* | 1/2016 | Sauerwein ................ E05F 5/00 701/49 |
| 2016/0052375 | A1* | 2/2016 | Scheuring ............... B60J 5/047 74/89.38 |
| 2016/0052376 | A1 | 2/2016 | Rosales et al. |
| 2016/0169886 | A1 | 6/2016 | Chou |
| 2016/0245010 | A1 | 8/2016 | Makino et al. |
| 2016/0312500 | A1 | 10/2016 | Hiramoto et al. |
| 2017/0089112 | A1 | 3/2017 | Rosales et al. |
| 2017/0247927 | A1* | 8/2017 | Elie ........................ E05F 15/60 |
| 2019/0145133 | A1 | 5/2019 | Graute et al. |
| 2019/0169886 | A1 | 6/2019 | Rosales |

FOREIGN PATENT DOCUMENTS

| | | |
|---|---|---|
| DE | 202012004789 | 10/2013 |
| EP | 1700989 | 9/2006 |
| EP | 2339098 | 6/2011 |
| WO | 2012059161 | 5/2012 |

OTHER PUBLICATIONS

File History for U.S. Appl. No. 15/075,665 downloaded Aug. 21, 2018 (145 pages).
File History for U.S. Appl. No. 15/809,434 downloaded Feb. 6, 2018 (106 pages).
Non-Final Office Action for U.S. Appl. No. 15/828,879 dated Jun. 24, 2019 (15 pages).
Non-Final Office Action for U.S. Appl. No. 15/809,434 dated May 19, 2020 (15 pages).

* cited by examiner

HATCH ARRANGEMENT OF A MOTOR VEHICLE

FIELD OF THE TECHNOLOGY

The disclosure is directed at a hatch arrangement for a motor vehicle and a hatch drive arrangement.

BACKGROUND

Presently, the expression "hatch arrangement" is to be understood in a broad sense. It includes in particular any kind of doors of a motor vehicle such as side doors or back doors as well as tailgates, liftgates, trunk lids or engine hoods.

From the prior art and in particular U.S. Pat. No. 9,677,318 B2 a power tailgate with a cinching system is known. Once the catch of the hatch lock of the tailgate has reached its secondary latch position, the cinching system acts on the hatch lock to move the catch from the secondary latch position to the primary latch position, thereby ensuring an automatic closing of the hatch which is secure and complete.

In the prior art, the cinching system is built outside the hatch lock (external cinching system). According to said prior art the hatch arrangement comprises in one embodiment two hatch drive arrangements which both comprise a spindle drive. One end of the respective hatch drive arrangement is coupled to the vehicle body and the other end is coupled to a pivotable cinching catch of the cinching system. The cinching catch, which is arranged on the hatch leaf, is configured for engaging a cinching striker of the motor vehicle, which is arranged on the vehicle body. The respective hatch drive arrangement has two functions; on one hand the hatch drive arrangement is able to move the hatch leaf between an open hatch position and a closed hatch position and on the other hand the hatch drive arrangement also forms the drive for the cinching system when the hatch is almost closed. In the corresponding position of the hatch leaf at that time the hatch drive arrangement, in particular the spindle drive, courses a pivoting of the cinching catch towards a closed cinching catch position in which the cinching catch engages the cinching striker. By thus moving the cinching catch, the hatch leaf is also moved from the almost closed hatch position in the fully closed hatch position. Said movement of the hatch leaf in turn causes the hatch lock catch, which then is in contact with a corresponding hatch lock striker, to move from the secondary latch position in the primary latch position.

Although the hatch arrangement according to the prior art described above is very reliable, the construction of the hatch arrangement is quite complex, since on both sides of the hatch a respective hatch drive arrangement is needed to uniformly move the hatch leaf in the closed hatch position.

SUMMARY

It is therefore an object of the disclosure to improve the known hatch arrangement including a cinch system to make it simpler and more robust in its construction and to overcome the aforementioned drawbacks.

The above noted object is solved for a hatch arrangement for a motor vehicle according to the disclosure.

For a hatch drive arrangement for such a hatch arrangement the above noted object is solved with the features as described herein.

The basic idea underlying the disclosure is to provide a force transfer arrangement for transferring a force, such as a pulling force, exerted by the hatch drive arrangement to the hatch lock catch for moving the hatch lock catch from its secondary latch position to its primary latch position. Also in this case the hatch drive arrangement has two functions, that is, on one hand it is used for moving the hatch leaf between the open hatch position and the closed hatch position, and on the other hand it is used for operating the cinching system. However, according to the disclosure the hatch drive arrangement does not actuate a separate cinching catch which moves the hatch leaf from an almost closed hatch position in a fully closed hatch position which in turn moves the separate hatch lock catch from the secondary latch position in the primary latch position, but the hatch drive arrangement exerts its force via a transfer element and a Bowden cable to the hatch lock catch itself. Accordingly, the hatch lock catch is moved, namely pulled, from the secondary latch position in the primary latch position directly by the cinching system. According to the disclosure there is no need for two separate hatch drive arrangements and cinching systems with separate cinching catches and cinching strikers arranged on both sides of the hatch leaf. Moreover, no sensors are required in the hatch lock sensing the secondary latch position and the primary latch position for controlling the hatch drive arrangements. In the present case the internal sensors of the hatch drive arrangement, in particular of the spindle drive, may be used to start and stop the driving motion. Accordingly, the construction of the cinching system is more simple and more robust compared to the prior art. Also, since the cinching system directly acts on the hatch lock catch, which is usually arranged substantially in the middle of the outer most hatch leaf edge, there is no longer the need to uniformly operate separate cinching catches at both lateral sides of the hatch leaf.

In detail, according to the disclosure the hatch arrangement comprises as part of the cinching system a force transfer arrangement for transferring a force, such as a pulling force, exerted by the hatch drive arrangement to the hatch lock catch, the force transfer arrangement comprising a transfer element coupled to the hatch drive arrangement and a Bowden cable connecting the transfer element with the hatch lock catch, wherein in the closed hatch position of the hatch leaf the hatch arrangement is free from pulling forces between the transfer element and the vehicle body.

Various embodiments further specify the functioning of the transfer element of the force transfer arrangement. In particular, the transfer element merely has the purpose of transferring forces between the hatch drive arrangement and the hatch leaf on one hand and between the hatch drive arrangement and the hatch lock catch on the other hand. Beside that, the transfer element does not need to absorb further loads. Particularly, the transfer element is not used to pull the hatch leaf towards the vehicle body to move the hatch leaf from the named almost closed hatch position into the fully closed hatch position. Instead, according to the present disclosure this is done by the hatch lock catch when engaging the hatch lock striker and when being pulled from the secondary latch position into the primary latch position by the cinching system.

According to some embodiments, the transfer element is a lever. With such a lever a force, in particular a pulling force, exerted by the hatch drive arrangement may be easily transferred to the Bowden cable connected with the hatch lock catch, while the force, in particular the pulling force, exerted by the hatch drive arrangement may also be transferred to the hatch leaf via the lever axis to move the hatch leaf between the open hatch position and the almost closed and the fully closed hatch position. However, it is also conceivable to provide a transfer element which transfers the respective forces and movements linearly. However, as described before, it can be to transfer the linear movement of the hatch drive arrangement into a pivoting movement of the transfer element, which pivoting movement is then transferred into a linear movement of the Bowden cable.

Some embodiments define various motion courses of the transfer element, in particular the lever.

In some embodiments, a spindle drive—which is an advantageous drive solution for a hatch drive arrangement—is provided for both the movement of the hatch leaf and the operation of the cinching system. The construction of a spindle drive is for example described in U.S. Pat. No. 9,255,436 which is hereby incorporated by reference. However, it is also conceivable to use a pushrod drive instead. A pushrod drive construction is for example described in U.S. Pat. No. 9,103,154 which is also hereby incorporated by reference.

According to some embodiments, only one single hatch drive arrangement and in particular only one single spindle drive is provided for the above mentioned purposes, that is for moving both the hatch leaf an the hatch lock catch. As already described before, it is no longer necessary to provide two separate hatch drive arrangements and cinching systems, since it is now possible, to transfer the forces, e.g. pulling forces, from the hatch drive arrangement via the transfer element and the Bowden cable directly to the hatch lock catch, which is usually arranged in the middle section of the outer most hatch leaf edge, which is the edge or side of the hatch leaf opposite to the hatch axis.

Various embodiments make use of the fact that a Bowden cable can easily penetrate through a separating wall which separates the wet area of the hatch arrangement from the dry area of the hatch arrangement. Since a Bowden cable comprises a movable inner cable and a stationary housing, the hole in the separating wall through which the Bowden cable housing extends can be easily sealed.

According to some embodiments, the hatch drive arrangement comprises means for detecting a condition and/or a position of the hatch drive arrangement which corresponds to the condition of the hatch lock when the hatch lock catch is in the secondary latch position. For example, a pushbutton may be arranged on a housing section of the hatch arrangement, in particular a housing section of the spindle drive, which pushbutton is actuated in a specific position of said housing section relative to the vehicle body, for example, when the housing section presses the pushbutton against the vehicle body. At the same time when the pushbutton is actuated, the hatch lock catch is moved in the second latch position. In said condition of the hatch lock the actuation of the pushbutton may cause the hatch drive arrangement, in particular the spindle drive, to exert a higher force, e.g. pulling force, than before, such that a higher pulling force is applied to the hatch lock catch while moving from the secondary latch position to the primary latch position. It is also conceivable to use a Hall-effect sensor, which for example counts the revolutions of the drive shaft of the hatch drive arrangement motor, in particular the motor of the spindle drive. By counting the revolutions, the condition of the hatch drive arrangement may also be detected which corresponds to the condition of the hatch lock when the hatch lock catch is moved in the secondary latch position.

Various embodiments define at least one elastic member which forces the transfer element in the direction of the first transfer element position.

According to some embodiments means for detecting a condition and/or a position of the hatch drive arrangement and/or a hard stop or damping stop may be provided.

In some embodiments includes wherein the cinching system and/or transfer element may also cause the hatch lock catch to move from the secondary latch position into the primary latch position without provision of the described Bowden cable. Accordingly, in said embodiment the hatch arrangement does not comprise a Bowden cable connecting the transfer element with the hatch lock catch. The individual features of said hatch arrangement can be designed as described above and below.

Various embodiments provide a hatch arrangement for a motor vehicle, the hatch arrangement comprising a hatch leaf pivotably coupled to a vehicle body of the motor vehicle and being movable around a hatch axis between an open hatch position and a closed hatch position, a hatch drive arrangement for moving the hatch leaf, a hatch lock arranged on the hatch leaf, the hatch lock comprising a hatch lock catch for engaging a hatch lock striker in a retaining manner in a primary latch position and in a secondary latch position and for disengaging the hatch lock striker in an open latch position, and a cinching system configured to move the hatch lock catch from the secondary latch position to the primary latch position, wherein the hatch arrangement comprises, as part of the cinching system, a force transfer arrangement for transferring a force, such as a pulling force, exerted by the hatch drive arrangement to the hatch lock catch, wherein the force transfer arrangement comprises a transfer element coupled to the hatch drive arrangement and a Bowden cable connecting the transfer element with the hatch lock catch, and wherein in the closed hatch position of the hatch leaf the hatch arrangement is free from pulling forces between the transfer element and the vehicle body.

In some embodiments, the transfer element itself does not provide a locking function between the hatch leaf and the vehicle body.

In some embodiments, during most of the movement or the whole movement of the hatch lock catch from the second latch position to the primary latch position no forces are transferred from the transfer element to the vehicle body.

In some embodiments, the transfer element is a lever mounted to the hatch leaf and being pivotable around a lever axis, wherein the hatch drive arrangement is coupled to the transfer element at a first coupling point and the Bowden cable is coupled to the transfer element at a second coupling point, the first coupling point and the second coupling point being offset from the lever axis of the transfer element, such as, wherein the lever is mounted at a lateral side of the hatch leaf and/or wherein the lever axis is substantially parallel to the hatch axis.

In some embodiments, the transfer element comprises one effective lever arm, wherein both the first coupling point and the second coupling point are arranged on the same effective lever arm.

In some embodiments, the transfer element is movable between a first transfer element position and a second transfer element position.

In some embodiments, a movement of the transfer element from the first transfer element position to the second transfer element position effects an increasement of the cutting angle defined between a first straight line that runs through the hatch axis and the lever axis and a second straight line that runs through the first coupling point and a connecting point in which the hatch drive arrangement is coupled to the vehicle body.

In some embodiments, a movement of the transfer element from the first transfer element position to the second transfer element position effects the movement of the hatch lock catch from the second latch position to the first latch position.

In some embodiments, an inner cable of the Bowden cable is coupled to the transfer element such that, during a movement of the transfer element from the first transfer element position to the second transfer element position, the inner cable of the Bowden cable is partially wound around the transfer element.

In some embodiments, the first transfer element position and/or the second transfer element position are defined by a respective end stop, such as, wherein the respective end stop is formed on the hatch leaf.

In some embodiments, when the transfer element is in the first transfer element position, the first coupling point is positioned at one side of an imaginary line which extends through the first coupling point and a connecting point in which the hatch drive arrangement is coupled to the vehicle body, such as, wherein the side of the imaginary line is the side facing in a direction from the vehicle body towards the hatch leaf.

In some embodiments, during the whole movement of the transfer element from the first transfer element position to the second transfer element position the first coupling point does not cross the imaginary line extending through the first coupling point and the connecting point in which the hatch drive arrangement is coupled to the vehicle body.

In some embodiments, the hatch drive arrangement comprises a spindle drive.

In some embodiments, the hatch arrangement comprises merely one single hatch drive arrangement with one single force transfer arrangement, such as, wherein the hatch arrangement comprises merely one single spindle drive.

In some embodiments, the hatch lock is arranged on the side of the hatch leaf which is opposite to the hatch axis.

In some embodiments, the hatch drive arrangement is arranged in the wet area of the hatch arrangement, whereas the hatch lock is arranged in the dry area of the hatch arrangement, such as, wherein also the transfer element is arranged in the wet area of the hatch arrangement, wherein the Bowden cable extends from the wet area to the dry area through a seal in a separating wall which separates the wet area from the dry area.

In some embodiments, the hatch drive arrangement comprises means for detecting a condition and/or a position of the hatch drive arrangement which corresponds to the condition of the hatch lock when the hatch lock catch is in the secondary latch position, such as, wherein the means include an electronic or mechanical pushbutton and/or a Hall-effect sensor.

In some embodiments, the hatch drive arrangement comprises at least one elastic member which forces the transfer element in the direction of the first transfer element position, such as, wherein the at least one elastic member is configured to hold the transfer element in the first transfer element position during movement of the hatch leaf from the open hatch position to the almost closed hatch position.

In some embodiments, an elastic member is positioned such that it acts indirectly on the transfer element via the hatch lock catch and/or the Bowden cable, and/or an elastic member is positioned such that it acts directly on the transfer element.

In some embodiments, means for detecting a condition and/or a position of the hatch drive arrangement and/or a hard stop or damping stop is provided which dampens or limits or reverses a lateral movement of the hatch drive arrangement relative to the vehicle body, when the hatch drive arrangement moves the hatch leaf in the direction from the open hatch position to the closed hatch position.

Various embodiments provide a hatch arrangement for a motor vehicle, the hatch arrangement comprising a hatch leaf pivotably coupled to a vehicle body of the motor vehicle and being movable around a hatch axis between an open hatch position and a closed hatch position, a hatch drive arrangement for moving the hatch leaf, a hatch lock arranged on the hatch leaf, the hatch lock comprising a hatch lock catch for engaging a hatch lock striker in a retaining manner in a primary latch position and in a secondary latch position and for disengaging the hatch lock striker in an open latch position, and a cinching system configured to move the hatch lock catch from the secondary latch position to the primary latch position, wherein the hatch arrangement comprises, as part of the cinching system, a force transfer arrangement for transferring a force, such as a pulling force, exerted by the hatch drive arrangement to the hatch lock catch, wherein the force transfer arrangement comprises a transfer element, the hatch drive arrangement being coupled to the transfer element at a first coupling point of the transfer element, the transfer element being pivotably coupled to the hatch leaf and being movable around a lever axis, wherein in the closed hatch position of the hatch leaf the hatch arrangement is free from pulling forces between the transfer element and the vehicle body, wherein a force applied on the hatch lock catch to move from the secondary latch position into the primary latch position is transferred from the hatch drive arrangement merely via the transfer element to the hatch leaf, and from the hatch leaf to the hatch lock catch, and wherein a movement of the transfer element from a first transfer element position to a second transfer element position, which effects the movement of the hatch lock catch from the secondary latch position into the primary latch position, effects an increasement of the cutting angle defined between a first straight line that runs through the hatch axis and the lever axis and a second straight line that runs through the first coupling point and a connecting point in which the hatch drive arrangement is coupled to the vehicle body.

Various embodiments provide a hatch drive arrangement for a hatch arrangement according to the disclosure.

Various embodiments provide a hatch arrangement for a motor vehicle, in particular a hatch arrangement as described herein, the hatch arrangement comprising a hatch leaf pivotably coupled to a vehicle body of the motor vehicle and being movable around a hatch axis between an open hatch position and a closed hatch position, a hatch drive arrangement for moving the hatch leaf, a hatch lock arranged on the hatch leaf, the hatch lock comprising a hatch lock catch for engaging a hatch lock striker in a retaining manner in a primary latch position and in a secondary latch position and for disengaging the hatch lock striker in an open latch position, and a cinching system configured to move the hatch lock catch from the secondary latch position to the primary latch position, wherein the hatch arrangement comprises, as part of the cinching system, a force transfer arrangement for transferring a pulling force exerted by the hatch drive arrangement to the hatch lock catch, the force transfer arrangement comprising a transfer element coupled to the hatch drive arrangement and a Bowden cable connecting the transfer element with the hatch lock catch, wherein in the closed hatch position of the hatch leaf the hatch arrangement is free from pulling forces between the transfer element and the vehicle body.

BRIEF DESCRIPTION OF THE DRAWINGS

In the following, the disclosure will be described with reference to a single exemplary embodiment illustrated in the drawing. The drawing shows in FIG. 1 a schematic side view of a motor vehicle with a hatch arrangement according to the proposal, FIG. 2 a more detailed view of a part of the hatch arrangement of FIG. 1 a) with the hatch leaf in an open hatch position and b) with the hatch leaf in an almost closed hatch position, FIG. 3 the detail III of FIG. 2 in an enlarged view a) with the hatch leaf in the almost closed hatch position and b) with the hatch leaf in a fully closed hatch position and FIG. 4 the detail Ill of FIG. 2 in an enlarged view with the hatch leaf in the fully closed hatch position after the hatch drive arrangement is turned off, and FIG. 5 a further embodiment of the hatch arrangement in a detailed view a) with the hatch leaf in the almost closed hatch position and b) with the hatch leaf in a fully closed hatch position.

DETAILED DESCRIPTION

Figure 1:
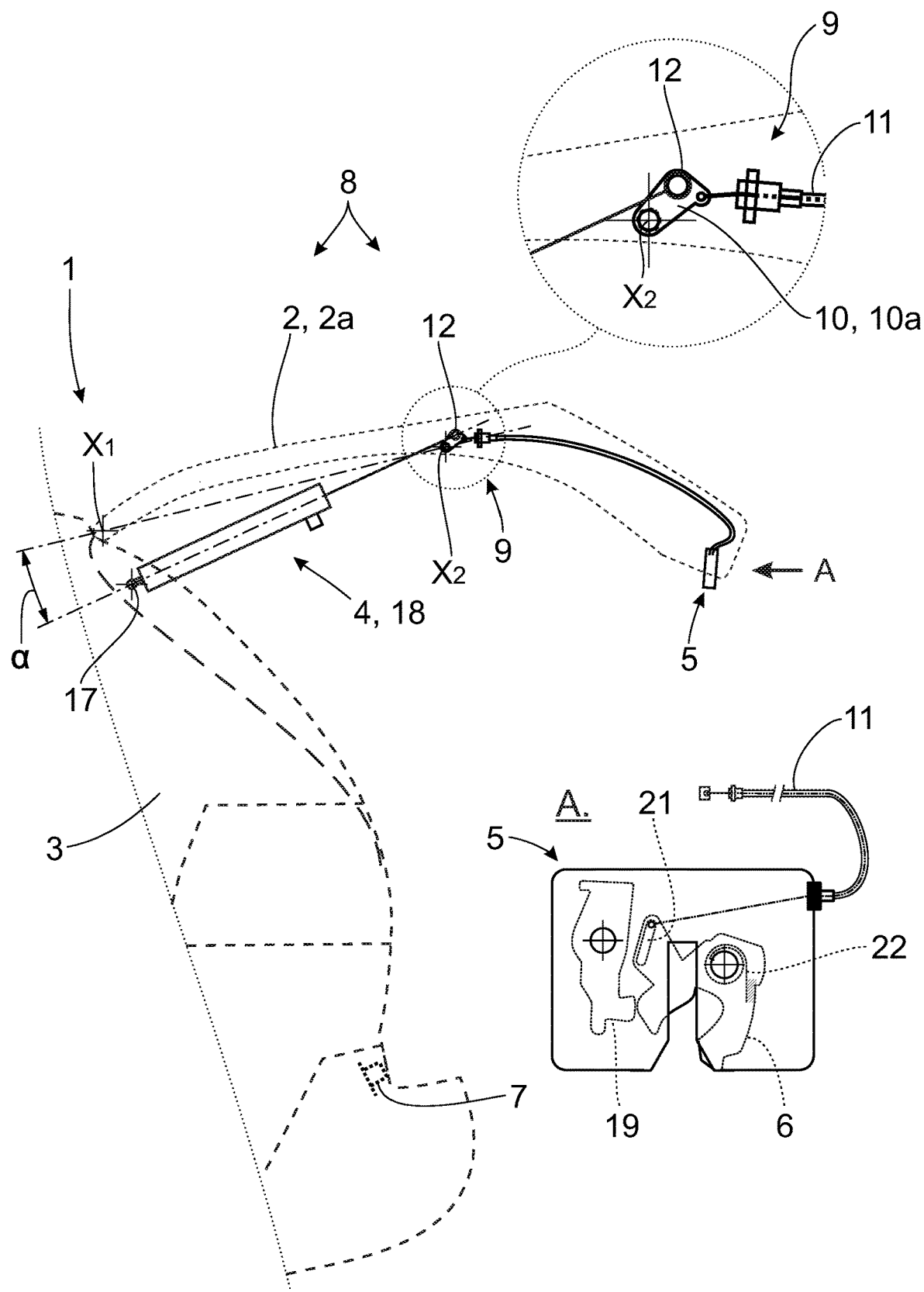
Figure 2:
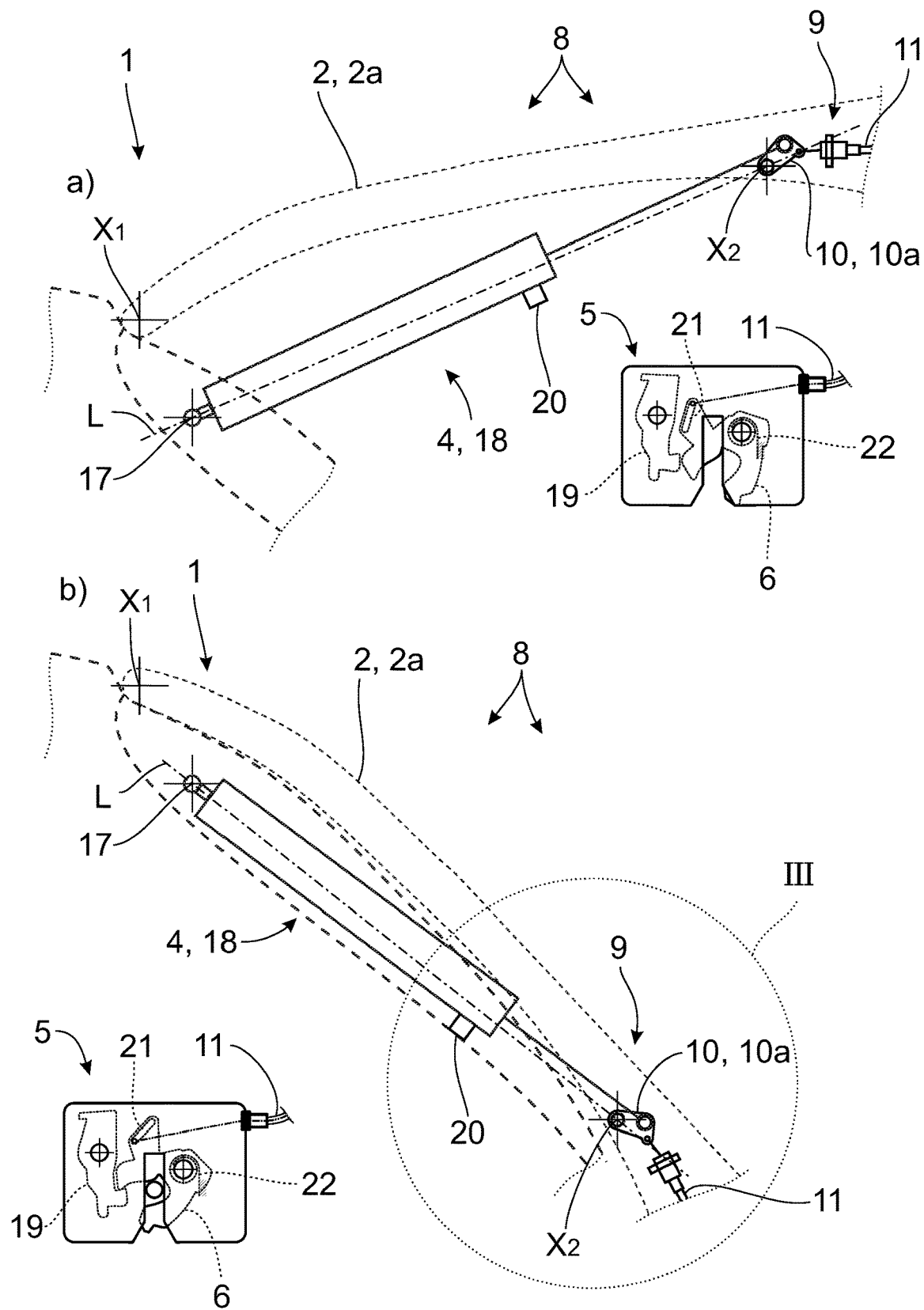
Figure 3:
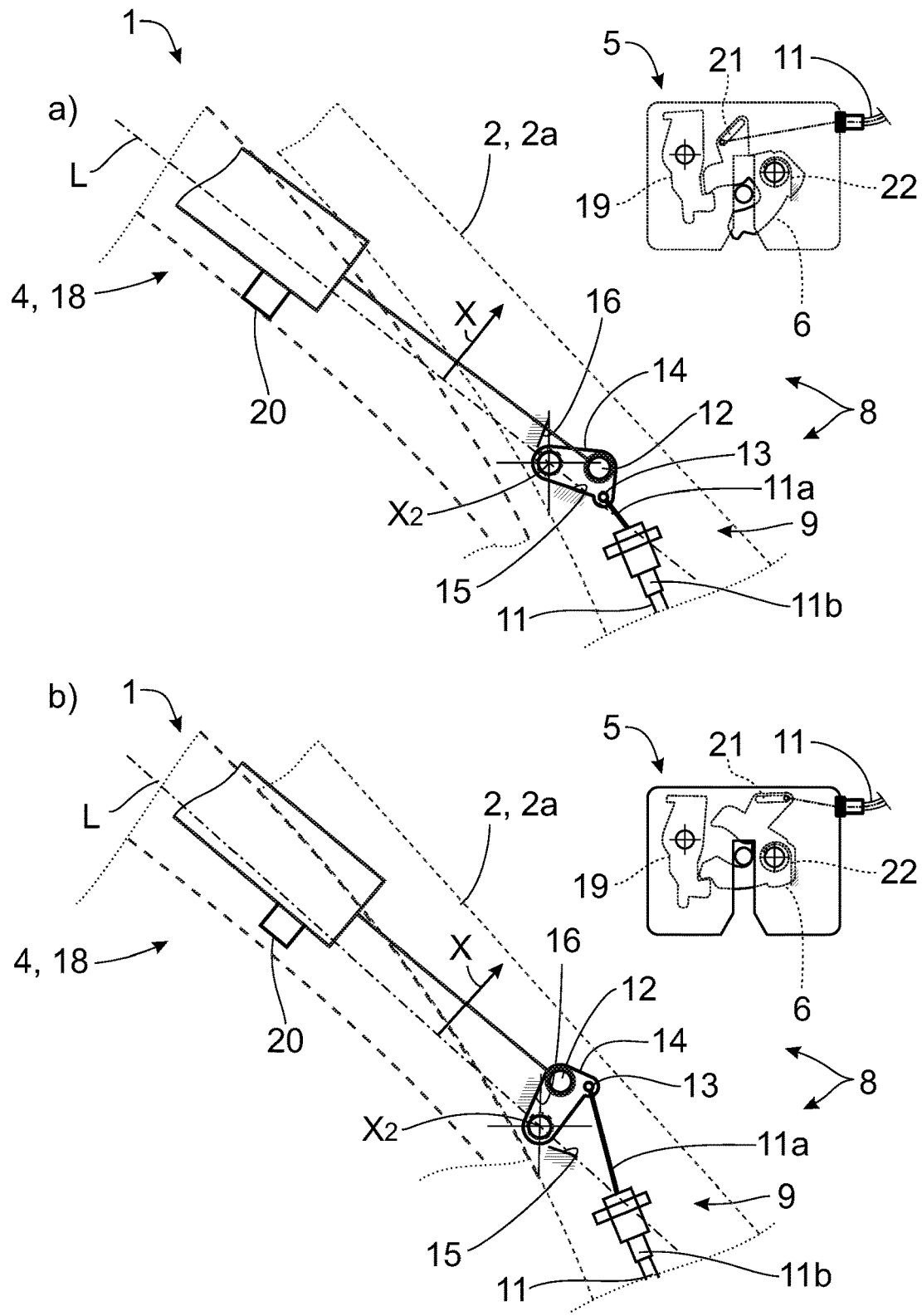

The hatch arrangement shown in the figures is assigned to a motor vehicle 1 shown partially in FIG. 1. The hatch arrangement comprises a hatch leaf 2—in the embodiment shown the hatch leaf 2 is a tailgate 2*a*—pivotably coupled to a vehicle body 3 of the motor vehicle 1 and being movable between an open hatch position (FIG. 1, FIG. 2*a*) and a closed hatch position, in particular an almost closed hatch position (FIG. 2*b*, FIG. 3*a*) and a fully closed hatch position (FIG. 3*b*). The hatch arrangement may also comprise any other kind of door of a motor vehicle, such as a sliding door. The hatch arrangement further comprises a hatch drive arrangement 4 for moving the hatch leaf 2. In particular, the hatch drive arrangement 4 may be configured for moving the hatch leaf 2 between the open hatch position and the respective closed hatch position in one or both directions.

Furthermore, a hatch lock 5 is arranged on the hatch leaf 2, the hatch lock 5 comprising a hatch lock catch 6 for engaging a hatch lock striker 7 in a retaining manner in a secondary latch position and in a primary latch position and for disengaging the hatch lock striker 7 in an open latch position. The hatch lock catch 6 being in the secondary latch position is shown in FIG. 2*b* and FIG. 3*a*. The hatch lock catch 6 being in the primary latch position is shown in FIG. 3*b*. The open latch position of the hatch lock catch 6 is shown in FIG. 1 and FIG. 2*a*. It can be seen that when the hatch leaf 2 is in the open hatch position, the hatch lock catch 6 is in the open latch position. When the hatch leaf 2 has been moved from the open hatch position to the almost closed hatch position shown in FIG. 2*b*, the hatch lock catch 6 is in the secondary latch position. When having moved the hatch leaf 2 further into the fully closed hatch position, as shown in FIG. 3*b*, the hatch lock catch 6 is in the primary latch position.

As described above, the movements of the hatch leaf 2 are caused by the hatch drive arrangement 4. The movement of the hatch lock catch 6 from the secondary latch position in the primary latch position is caused by a cinching system 8.

The proposed hatch arrangement is characterized in that it comprises, as part of the cinching system 8, a force transfer arrangement 9 for transferring a force, here a pulling force, exerted by the hatch drive arrangement 4 to the hatch lock catch 6. The force transfer arrangement 9 comprises a transfer element 10 coupled to the hatch drive arrangement 4 and a Bowden cable 11 connecting the transfer element 10 with the hatch lock catch 6, thereby coupling the hatch drive arrangement 4 to the hatch lock catch 6. The hatch drive arrangement 4 therefore does not only move the hatch leaf 2 between the respective hatch positions, but also causes the movement of the hatch lock catch 6 from the secondary latch position in the primary latch position in a cinching action. Accordingly, the cinching system 8 directly acts on the hatch lock catch 6 (internal cinching system).

As can be seen in the figures, in the closed hatch position of the hatch leaf 2, in particular in the almost closed hatch position as shown in FIG. 2*b* and FIG. 3*a* and/or in the fully closed hatch position as shown in FIG. 3*b*, the hatch arrangement is free from pulling forces between the transfer element 10 and the vehicle body 3. In particular, the only pulling forces holding the hatch leaf 2 in its respective closed hatch position are pulling forces between the hatch lock catch 6 and the hatch lock striker 7. Accordingly, in the hatch arrangement, in some embodiments, only the hatch lock catch 6 provides a locking function between the hatch leaf 2 and the vehicle body 3. In contrast to the prior art, the transfer element 10 itself, in some cases, does not provide a locking function between the hatch leaf 2 and the vehicle body 3.

In particular, at least during most of the movement of the hatch lock catch 6 from the secondary latch position to the primary latch position, such as during the whole movement of the hatch lock catch 6 from the secondary latch position to the primary latch position, no forces at all are transferred from the transfer element 10 to the vehicle body 3.

In the particular embodiment shown in the figures, the transfer element 10 is formed as a lever 10*a* which is mounted to the hatch leaf 2. Said lever 10*a* is pivotable around a lever axis $x_2$. However, for transferring the forces from the hatch drive arrangement 4 to both the hatch leaf 2 and the hatch lock catch 6 it is also conceivable to use a linearly movable transfer element as well.

In the present case the hatch drive arrangement 4 is coupled to the transfer element 10, here to the lever 10*a*, at a first coupling point 12. The Bowden cable 11 is coupled to the same transfer element 10 at a second coupling point 13. The first coupling point 12 and the second coupling point 13 are offset from the lever axis $x_2$. In the present case the lever 10*a* is mounted at a lateral side of the hatch leaf 2, that is the lateral edge of the hatch leaf 2 extending substantially perpendicular to the hatch axis $x_1$. Here, the lever axis $x_2$ is substantially parallel to the hatch axis $x_1$.

With the above described construction of the exemplary embodiment, a linear movement of the hatch drive arrangement 4 is transferred into a pivoting movement of the transfer element 10, which pivoting movement is transferred into a further linear movement of the Bowden cable 11. A linear movement of the Bowden cable 11 means that an inner cable 11*a* of the Bowden cable 11 moves back and forth inside the Bowden cable housing 11*b* formed around said inner cable 11*a*. The Bowden cable housing 11*b* itself is fixed and therefore can not move back and forth.

Accordingly, in the proposed hatch arrangement shown in the exemplary embodiment of the figures the hatch drive arrangement 4 and the Bowden cable 11 both linearly transfer forces, whereas the lever 10*a* transfers forces by pivoting. Here, the only torque exerted on the lever 10*a* is a torque exerted by the hatch drive arrangement 4 and the Bowden cable 11.

According to an embodiment the inner cable 11a of the Bowden cable 11 may be coupled to the transfer element 10 such that, during a movement of the transfer element 10 from the first transfer element position to the second transfer element position, the inner cable 11a of the Bowden cable 11 is partially wound around the transfer element 10, as for example shown in FIGS. 5a and b. This has the advantage that the movement of the hatch lock catch 6 can be effected with a smaller pivoting movement of the transfer element 10. In the embodiment of FIGS. 5a and b, also the positions of the first coupling point 12 and the second coupling point 13 are mirrored compared to FIGS. 1 to 3.

As best can be seen in FIGS. 3a and b, the transfer element 10 comprises an effective lever arm 14, here in particular exactly one effective lever arm 14, wherein both the first coupling point 12 and the second coupling point 13 are arranged on the same effective lever arm 14. The transfer element 10, here the lever 10a, is movable between a first transfer element position (FIG. 3a) and a second transfer element position (FIG. 3b). Here, the movement of the transfer element 10 from the first transfer element position to the second transfer element position effects an increasement of the cutting angle $\alpha$ defined between a first straight line that runs through the hatch axis $x_1$ and the lever axis $x_2$ and a second straight line that runs through the first coupling point 12 and a connecting point 17 in which the hatch drive arrangement 4 is coupled to the vehicle body 3. The cutting angle $\alpha$ is defined as the smaller angle of the two congruent angles defined by the first and second straight line, which angle $\alpha$ is therefore acute or right-angled.

Moreover, in said embodiment the movement of the transfer element 10 from the first transfer element position to the second transfer element position effects the movement of the hatch lock catch 6 from the secondary latch position in the primary latch position.

The hatch drive arrangement 4, the force transfer arrangement 9 and/or the hatch leaf 2 are arranged and configured such that a movement of the transfer element 10 from the first transfer element position to the second transfer element position is only effected after the hatch leaf 2 has been moved from the open hatch position to the almost closed hatch position, the latter shown in FIG. 3a. In contrast thereto, when the hatch leaf 2 is in an open hatch position, the hatch drive arrangement 4 is only able to move the hatch leaf 2 into the almost closed hatch position shown in FIG. 2b and FIG. 3a. During the movement of the hatch leaf 2 from the open hatch position to the almost closed hatch position, the transfer element 10, here the lever 10a, does not move, but remains in its first transfer element position. To hold the transfer element 10 in the first transfer element position during movement of the hatch leaf 2 from the open hatch position to the almost closed hatch position, also an elastic member 22, 23, e.g. a spring, may be provided which forces the transfer element 10 in the direction of the first transfer element position. In this case one elastic member 22 is a spring, such as a rotational spring, acting on the hatch lock catch 6 such that the hatch lock catch 6 is forced towards the open latch position. Said elastic member 22 is positioned such that it acts indirectly on the transfer element 10 via the hatch lock catch 6 and/or the Bowden cable 11.

Figure 4:
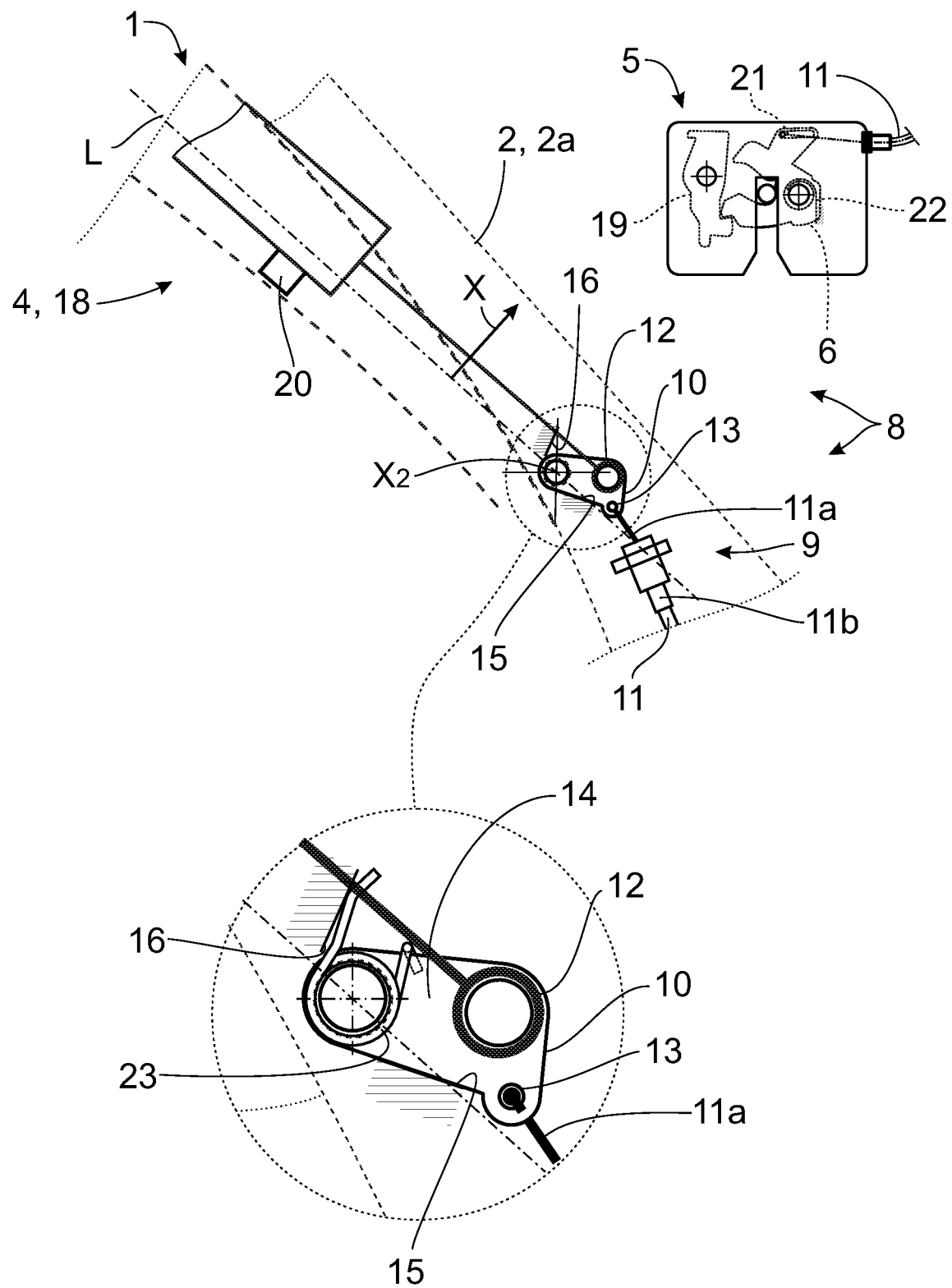
Figure 5:
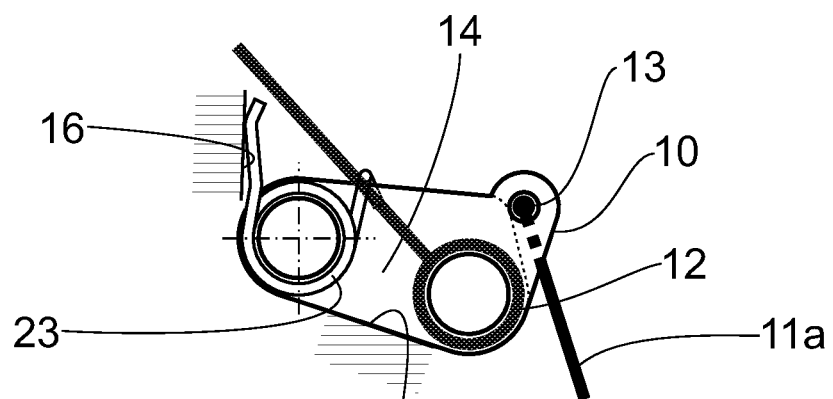
Figure 5:
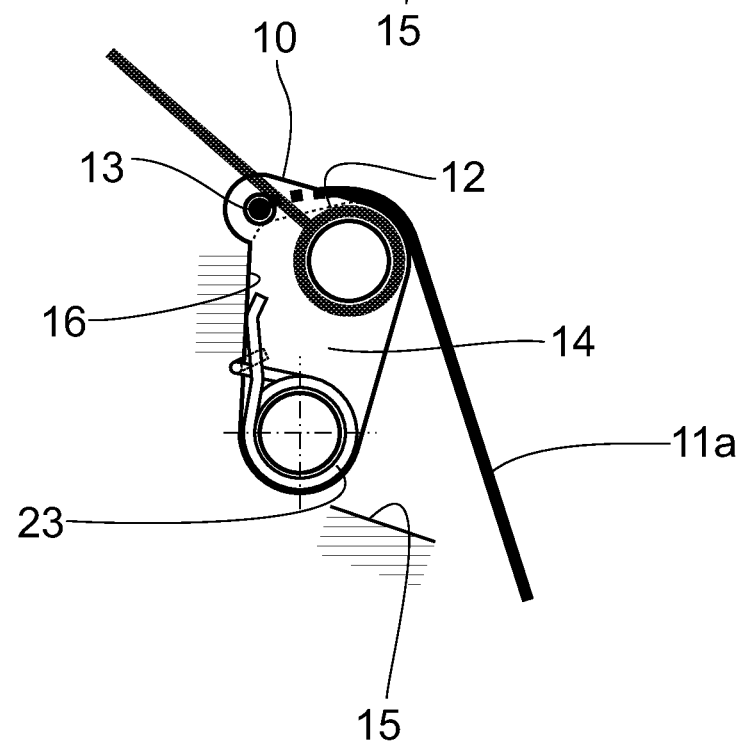

In addition or alternatively, as shown for example in FIGS. 4 and 5, a different elastic member 23 may be positioned such that it acts directly on the transfer element 10. The latter, which may also be a spring, such as a rotational spring, has the further advantage that the transfer element 10 is moved from its second transfer element position (FIG. 5b) to its first transfer element position (FIGS. 4 and 5a) after the hatch lock catch 6 has reached its primary latch position and after the hatch drive arrangement 4 is turned off. By means of the elastic member 23 the hatch drive arrangement 4 follows the movement of the transfer element 10 accordingly.

As soon as the hatch leaf 2 reaches, during its closing movement, the almost closed hatch position of FIG. 3a, the force exerted by the hatch drive arrangement 4 to the transfer element 10 is increased such that the transfer element 10 is pulled from its first transfer element position to its second transfer element position. This in turn causes the respective movement of the Bowden cable 11 and accordingly of the hatch lock catch 6 from the secondary latch position into the primary latch position, thereby forcing the hatch leaf 2 from the almost closed hatch position of FIG. 3a into the fully closed hatch position of FIG. 3b.

In the shown embodiment, the first transfer element position and the second transfer element position are both defined by a respective end stop 15, 16, both end stops 15, 16 being formed on the hatch leaf 2, in particular on the lateral side or edge of the hatch leaf 2. The end stops 15, 16 are arranged such that, when the transfer element 10, here the lever 10a, is in the first transfer element position, the first coupling point 12 is positioned at one side of an imaginary line L which extends through the first coupling point 12 and a connecting point 17 in which the hatch drive arrangement 4 is coupled to the vehicle body 3 and which is in particular offset from the hatch axis $x_1$. In some embodiments, the named side of the imaginary line L is the side facing in a direction X from the vehicle body 3 towards the hatch leaf 2.

The imaginary line L defines a dead point for the first coupling point 12. If the lever 10a would be pivoted into a position where the first coupling point 12 is positioned on the imaginary line L—said position being the dead point —, no torque would be transferred from the hatch drive arrangement 4 to the transfer element 10 and the transfer element 10 would not move. To avoid this, in the exemplary embodiment shown in the figures during the whole movement of the transfer element 10 from the first transfer element position to the second transfer element position the first coupling point 12 does not cross the imaginary line L. In the contrary, as can be seen from FIGS. 3a and b, due to the end stops 15, 16, in particular the end stop 15 defining the first transfer element position, the first coupling point 12 has a motion path which is completely on the side of the imaginary line L facing in the direction X. Therefore, the first coupling point 12 can not be positioned in the dead point on the imaginary line L or even on the opposite side of the imaginary line L. However, it is also conceivable to provide a construction where the first coupling point 12 would be arranged in the dead point or even on the opposite side of the imaginary line L, when the transfer element 10 is in its first transfer element position. Such a construction however requires means that push the transfer element 10 towards the side of the imaginary line L facing in the direction X, when the hatch leaf 2 reaches the almost closed hatch position shown in FIG. 3a during its closing movement. Such a means could for example be a protrusion arranged on the vehicle body 3 facing in the direction X. Accordingly, when the hatch leaf 2 reaches the almost closed hatch position, the means or protrusion, respectively, moves the transfer element 10 from its first transfer element position into a position where the first coupling point 12 is on the respective other side of the imaginary line L.

It can be that the hatch drive arrangement 4 comprises a spindle drive 18. The hatch drive arrangement 4 may also comprise any other kind of type of drive, in particular linear drive, for example a pushrod drive. A movement of the respective drive, in particular spindle drive 18, is then transferred via the transfer element 10 and the Bowden cable 11 to the hatch lock catch 6 as well as to the hatch leaf 2.

It is also possible that the hatch lock 5 is arranged on the side or edge of the hatch leaf 2 which is opposite to the hatch axis $x_1$, that is the side facing away from the hatch axis $x_1$. The hatch lock 5 can thereby be arranged substantially in the middle of the respective side of the hatch leaf 2 such that, when the hatch lock catch 6 is moved from the secondary latch position to the primary latch position, the hatch leaf 2 is uniformly moved from the almost closed hatch position of FIG. 3a in the fully closed hatch position in FIG. 3b.

Since the cinching system 8, in some cases, only uses one single catch, namely the hatch lock catch 6, merely one single hatch drive arrangement 4 with one single force transfer arrangement 9 of the type describe before and merely one single spindle drive 18 is needed to apply the required forces to the hatch leaf 2 and to the hatch lock catch 6. In some embodiments, the hatch drive arrangement 4 and/or the spindle drive 18 is placed e. g. in a rainwater gutter associated with the hatch leaf 2.

It is further possible that the hatch drive arrangement 4 is arranged in the wet area of the hatch arrangement, whereas the hatch lock 5 is arranged in the dry area of the hatch arrangement. Also the transfer element 10 can be arranged in the wet area of the hatch arrangement, wherein the Bowden cable 11 extends from the wet area to the dry area through a seal in a separating wall (not shown) which separates the wet area from the dry area.

The hatch lock 5 arranged on the hatch leaf 2 is shown in FIGS. 2a and b and FIGS. 3a and b together with the hatch leaf 2 being in an associated hatch position. According to this embodiment, the hatch lock 5 not only comprises the hatch lock catch 6 for engaging the hatch lock striker 7 as described before, but also comprises a pawl 19 for a blocking engagement with the hatch lock catch 6 and a release actuation lever (not shown) for deflecting the pawl 19 as well as other components of a vehicle lock. Moreover, in the exemplary embodiment shown in the figures the hatch lock catch 6 comprises means 21 for movably attaching the Bowden cable 11 such that the Bowden cable 11, in particular the inner cable, is always on tension and does not sag in particular when the hatch lock catch 6 is moved from the open latch position to the secondary latch position. Here for example a slotted hole is provided in the hatch lock catch 6, in which the respective end of the Bowden cable 11 is movably guided.

The hatch drive arrangement 4 can comprise an element or means for detecting a condition and/or a position of the hatch drive arrangement 4. In the present embodiment, an electronic pushbutton 20 is arranged on the housing of the hatch drive arrangement 4, in particular on the housing of the spindle drive 18. While the hatch drive arrangement 4 moves the hatch leaf 2 from the open hatch position to the almost closed hatch position, in the almost closed hatch position the pushbutton 20 comes into contact with the vehicle body 3 (FIG. 2b). At the same time, what also can be seen in FIG. 2b, the hatch lock striker 7 has pushed the hatch lock catch 6 into the secondary latch position. Accordingly, the means or pushbutton 20, respectively, is suitable to detect a condition and/or position of the hatch drive arrangement 4 which corresponds to the condition of the hatch lock 5 when the hatch lock catch 6 is in the secondary latch position. Actuation of the pushbutton 20 may then generate a signal that causes the hatch drive arrangement 4 or spindle drive 18, respectively, to exert a larger force, e.g. pulling force, for the purpose of moving the hatch lock catch 6 from the secondary latch position in the primary latch position. It is also conceivable to e. g. use a Hall-effect sensor, in particular a Hall-effect sensor of the spindle drive 18, for the same purpose. The Hall-effect sensor in particular is an incremental sensor and counts the revolutions of the drive shaft of the hatch drive arrangement 4 or spindle drive 18, respectively. Since a specific number of revolutions can be associated with a specific latch position, also by means of a Hall-effect sensor the exerted force of the hatch drive arrangement 4 may be increased as soon as the hatch lock catch 6 is in its secondary latch position.

In addition or alternatively to the means for detecting a condition and/or a position of the hatch drive arrangement 4, in particular the pushbutton 20, a hard stop or damping stop (soft stop) may be provided which dampens or limits or even reverses the lateral movement of the hatch drive arrangement 4 relative to the vehicle body 3, when the hatch drive arrangement 4 moves the hatch leaf 2 in the direction from the open hatch position to the closed hatch position. Such a limitation or reversal of the lateral movement of the hatch drive arrangement 4 causes the movement of the transfer element 10 from the first transfer element position to the second transfer element position to be supported.

Such a hard stop or damping stop may be arranged on the vehicle body 3 and come into contact with the housing of the hatch drive arrangement 4, and/or may be arranged on the housing of the hatch drive arrangement 4 and come into contact with the vehicle body 3. The hard stop or damping stop may be arranged such that it comes into contact with the respective opposite surface (the housing of the hatch drive arrangement 4 and the vehicle body 3 respectively) only while the hatch lock catch 6 is in its secondary latch position, or also while the hatch lock catch 6 moves between its secondary latch position and its primary latch position. The same applies to the means for detecting a condition and/or a position of the hatch drive arrangement 4, in particular the pushbutton 20. In so far, also the means for detecting a condition and/or a position of the hatch drive arrangement 4, in particular the pushbutton 20, may serve as a hard stop or damping stop.

It is pointed out that the described cinching system 8 and/or transfer element 10 may also cause the hatch lock catch 6 to move from the secondary latch position into the primary latch position without provision of the described Bowden cable. In such an embodiment the hatch arrangement does not comprise a Bowden cable connecting the transfer element 10 with the hatch lock catch 6.

The force acting on the hatch lock catch 6 to move from the secondary latch position into the primary latch position is transferred from the hatch drive arrangement 4 merely via the transfer element 10 to the hatch leaf 2, and from the hatch leaf 2 to the hatch lock catch 6. For optimizing the force transfer from the hatch drive arrangement 4 to the hatch leaf 2, a movement of the transfer element 10 from the first transfer element position to the second transfer element position effects, when the hatch lock catch 6 has reached its secondary latch position, an increasement of the cutting angle $\alpha$ defined between a first straight line that runs through the hatch axis $x_1$ and the lever axis $x_2$ and a second straight line that runs through the first coupling point 12 and a connecting point 17 in which the hatch drive arrangement 4 is coupled to the vehicle body 3.

Accordingly, independently from the foregoing the present disclosure also relates to a hatch arrangement for a motor vehicle, which comprises a hatch leaf 2 pivotably coupled to a vehicle body 3 of the motor vehicle 1 and being movable around a hatch axis $x_1$ between an open hatch position and a closed hatch position. The hatch arrangement further comprises a hatch drive arrangement 4 for moving the hatch leaf 2, and a hatch lock 5 arranged on the hatch leaf 2, the hatch lock 5 comprising a hatch lock catch 6 for engaging a hatch lock striker 7 in a retaining manner in a primary latch position and in a secondary latch position and for disengaging the hatch lock striker 7 in an open latch position. Furthermore, the hatch arrangement comprises a cinching system 8 configured to move the hatch lock catch 6 from the secondary latch position to the primary latch position.

The hatch arrangement also comprises, as part of the cinching system 8, a force transfer arrangement 9 for transferring a force, such as a pulling force, exerted by the hatch drive arrangement 4 to the hatch lock catch 6, the force transfer arrangement 9 comprising a transfer element 10 being coupled to the hatch drive arrangement 4 and being pivotably mounted at the hatch leaf 2. In contrast to the prior art, also in this embodiment in the closed hatch position of the hatch leaf 2 the hatch arrangement is free from pulling forces between the transfer element 10 and the vehicle body 3.

Moreover, the force applied on the hatch lock catch 6 to move from the secondary latch position into the primary latch position is transferred from the hatch drive arrangement 4 merely via the transfer element 10 to the hatch leaf 2, and from the hatch leaf 2 to the hatch lock catch 6. In so far, the cinching system 8 is configured to indirectly move the hatch lock catch 6 from the secondary latch position to the primary latch position, and not directly via a Bowden cable.

A movement of the transfer element 10 from a first transfer element position to a second transfer element position, which effects the movement of the hatch lock catch 6 from the secondary latch position into the primary latch position, effects an increasement of the cutting angle $\alpha$ defined between a first straight line that runs through the hatch axis $x_1$ and the lever axis $x_2$ of the transfer element 10 and a second straight line that runs through a first coupling point 12 in which the hatch drive arrangement 4 is coupled to the transfer element 10 and a connecting point 17 in which the hatch drive arrangement 4 is coupled to the vehicle body 3.

Further, a hatch drive arrangement 4 for a hatch arrangement according to the proposal and any of its embodiments is disclosed.

The invention claimed is:

1. A hatch arrangement for a motor vehicle, the hatch arrangement comprising a hatch leaf pivotably coupled to a vehicle body of the motor vehicle and being movable around a hatch axis between an open hatch position and a closed hatch position, a hatch drive arrangement for moving the hatch leaf, a hatch lock arranged on the hatch leaf, the hatch lock comprising a hatch lock catch for engaging a hatch lock striker in a retaining manner in a primary latch position and in a secondary latch position and for disengaging the hatch lock striker in an open latch position, and a cinching system configured to move the hatch lock catch from the secondary latch position to the primary latch position, wherein the hatch arrangement comprises, as part of the cinching system, a force transfer arrangement for transferring a force exerted by the hatch drive arrangement to the hatch lock catch, wherein the force transfer arrangement comprises a transfer element coupled to the hatch drive arrangement and a Bowden cable connecting the transfer element with the hatch lock catch, wherein the transfer element is neither decoupled from the hatch drive arrangement nor the hatch lock catch during a closing movement, and wherein in the closed hatch position of the hatch leaf the hatch arrangement is free from pulling forces between the transfer element and the vehicle body.

2. The hatch arrangement according to claim 1, wherein the transfer element itself does not provide a locking function between the hatch leaf and the vehicle body.

3. The hatch arrangement according to claim 1, wherein during most of the movement or the whole movement of the hatch lock catch from the secondary latch position to the primary latch position no forces are transferred from the transfer element to the vehicle body.

4. The hatch arrangement according to claim 1, wherein the hatch drive arrangement comprises a spindle drive.

5. The hatch arrangement according to claim 1, wherein the hatch arrangement comprises merely one single hatch drive arrangement with one single force transfer arrangement.

6. The hatch arrangement according to claim 1, wherein the hatch lock is arranged on the side of the hatch leaf which is opposite to the hatch axis.

7. The hatch arrangement according to claim 1, wherein the hatch drive arrangement is arranged in a wet area of the hatch arrangement, whereas the hatch lock is arranged in a dry area of the hatch arrangement.

8. The hatch arrangement according to claim 1, wherein the hatch drive arrangement comprises an element for detecting a condition and/or a position of the hatch drive arrangement which corresponds to the condition of the hatch lock when the hatch lock catch is in the secondary latch position.

9. The hatch arrangement according to claim 1, further comprising an element operable to detect a condition and a position of the hatch drive arrangement and to dampen, limit, and reverse a lateral movement of the hatch drive arrangement relative to the vehicle body, when the hatch drive arrangement moves the hatch leaf in the direction from the open hatch position to the closed hatch position.

10. A hatch drive arrangement for a hatch arrangement according to claim 1.

11. A hatch arrangement for a motor vehicle, the hatch arrangement comprising a hatch leaf pivotably coupled to a vehicle body of the motor vehicle and being movable around a hatch axis between an open hatch position and a closed hatch position, a hatch drive arrangement for moving the hatch leaf, a hatch lock arranged on the hatch leaf, the hatch lock comprising a hatch lock catch for engaging a hatch lock striker in a retaining manner in a primary latch position and in a secondary latch position and for disengaging the hatch lock striker in an open latch position, and a cinching system configured to move the hatch lock catch from the secondary latch position to the primary latch position, wherein the hatch arrangement comprises, as part of the cinching system, a force transfer arrangement for transferring a force exerted by the hatch drive arrangement to the hatch lock catch, wherein the force transfer arrangement comprises a transfer element coupled to the hatch drive arrangement and a Bowden cable connecting the transfer element with the hatch lock catch, wherein a pivoting movement of the transfer element transfers the force from the hatch drive arrangement to the Bowden cable, and wherein in the closed hatch position of the hatch leaf the hatch arrangement is free from pulling forces between the transfer element and the vehicle body.

12. The hatch arrangement according to claim 11, wherein the transfer element is a lever mounted to the hatch leaf and being pivotable around a lever axis, wherein the hatch drive arrangement is coupled to the transfer element at a first coupling point and the Bowden cable is coupled to the transfer element at a second coupling point, the first coupling point and the second coupling point being offset from the lever axis of the transfer element.

13. The hatch arrangement according to claim 12, wherein the transfer element comprises one effective lever arm, wherein both the first coupling point and the second coupling point are arranged on the same effective lever arm.

14. The hatch arrangement according to claim 12, wherein the transfer element is movable between a first transfer element position and a second transfer element position.

15. The hatch arrangement according to claim 14, wherein a movement of the transfer element from the first transfer element position to the second transfer element position effects an increasement of a cutting angle defined between a first straight line that runs through the hatch axis and the lever axis and a second straight line that runs through the first coupling point and a connecting point in which the hatch drive arrangement is coupled to the vehicle body.

16. The hatch arrangement according to claim 14, wherein a movement of the transfer element from the first transfer element position to the second transfer element position effects the movement of the hatch lock catch from the secondary latch position to the primary latch position.

17. The hatch arrangement according to claim 16, wherein an inner cable of the Bowden cable is coupled to the transfer element such that, during a movement of the transfer element from the first transfer element position to the second transfer element position, the inner cable of the Bowden cable is partially wound around the transfer element.

18. The hatch arrangement according to claim 14, wherein the first transfer element position and/or the second transfer element position are defined by a respective end stop.

19. The hatch arrangement according to claim 14, wherein, when the transfer element is in the first transfer element position, the first coupling point is positioned at one side of an imaginary line which extends through the first coupling point and a connecting point in which the hatch drive arrangement is coupled to the vehicle body.

20. The hatch arrangement according to claim 19, wherein during the whole movement of the transfer element from the first transfer element position to the second transfer element position the first coupling point does not cross the imaginary line extending through the first coupling point and the connecting point in which the hatch drive arrangement is coupled to the vehicle body.

21. The hatch arrangement according to claim 14, wherein the hatch drive arrangement comprises at least one elastic member which forces the transfer element in the direction of the first transfer element position.

22. The hatch arrangement according to claim 21, wherein an elastic member is positioned such that it acts indirectly on the transfer element via the hatch lock catch and/or the Bowden cable, and/or an elastic member is positioned such that it acts directly on the transfer element.

23. A hatch arrangement for a motor vehicle, the hatch arrangement comprising a hatch leaf pivotably coupled to a vehicle body of the motor vehicle and being movable around a hatch axis between an open hatch position and a closed hatch position, a hatch drive arrangement for moving the hatch leaf, a hatch lock arranged on the hatch leaf, the hatch lock comprising a hatch lock catch for engaging a hatch lock striker in a retaining manner in a primary latch position and in a secondary latch position and for disengaging the hatch lock striker in an open latch position, and a cinching system configured to move the hatch lock catch from the secondary latch position to the primary latch position, wherein the hatch arrangement comprises, as part of the cinching system, a force transfer arrangement for transferring a force exerted by the hatch drive arrangement to the hatch lock catch, wherein the force transfer arrangement comprises a transfer element, the hatch drive arrangement being coupled to the transfer element at a first coupling point of the transfer element, the transfer element being pivotably coupled to the hatch leaf and being movable around a lever axis, wherein in the closed hatch position of the hatch leaf the hatch arrangement is free from pulling forces between the transfer element and the vehicle body, wherein a force applied on the hatch lock catch to move from the secondary latch position into the primary latch position is transferred from the hatch drive arrangement merely via the transfer element to the hatch leaf, and from the hatch leaf to the hatch lock catch, and wherein a movement of the transfer element from a first transfer element position to a second transfer element position, which effects the movement of the hatch lock catch from the secondary latch position into the primary latch position, effects an increasement of a cutting angle defined between a first straight line that runs through the hatch axis and the lever axis and a second straight line that runs through the first coupling point and a connecting point in which the hatch drive arrangement is coupled to the vehicle body.

24. A hatch arrangement for a motor vehicle, the hatch arrangement comprising a hatch leaf pivotably coupled to a vehicle body of the motor vehicle and being movable around a hatch axis between an open hatch position and a closed hatch position, a hatch drive arrangement for moving the hatch leaf, a hatch lock arranged on the hatch leaf, the hatch lock comprising a hatch lock catch for engaging a hatch lock striker in a retaining manner in a primary latch position and in a secondary latch position and for disengaging the hatch lock striker in an open latch position, and a cinching system configured to move the hatch lock catch from the secondary latch position to the primary latch position, wherein the hatch arrangement comprises, as part of the cinching system, a force transfer arrangement for transferring a pulling force exerted by the hatch drive arrangement to the hatch lock catch, the force transfer arrangement comprising a transfer element coupled to the hatch drive arrangement and a Bowden cable connecting the transfer element with the hatch lock catch, wherein the transfer element is neither decoupled from the hatch drive arrangement nor the hatch lock catch during a closing movement, and wherein in the closed hatch position of the hatch leaf the hatch arrangement is free from pulling forces between the transfer element and the vehicle body.

* * * * *